United States Patent [19]

Mennie et al.

[11] Patent Number: 4,713,926
[45] Date of Patent: Dec. 22, 1987

[54] PACKAGING MACHINE AND METHOD

[75] Inventors: John Mennie, Granville; Donald L. Troglio; Larry E. Zielinski, both of Mark, all of Ill.

[73] Assignee: Wheeling Stamping Company, Wheeling, W. Va.

[21] Appl. No.: 878,634

[22] Filed: Jun. 26, 1986

[51] Int. Cl.[4] .......................................... B65B 35/30
[52] U.S. Cl. ...................................... 53/443; 53/251; 53/382; 53/538
[58] Field of Search ................ 53/245, 247, 249, 251, 53/252, 254, 443, 475, 532, 535–538, 540, 149, 381 R, 448, 382

[56] References Cited

U.S. PATENT DOCUMENTS

| | | | |
|---|---|---|---|
| 2,904,944 | 9/1959 | Notredame et al. | 53/537 X |
| 3,612,299 | 10/1971 | Shaw | 53/537 X |
| 4,402,173 | 9/1983 | Thierion | 53/538 |
| 4,435,941 | 3/1984 | Booth et al. | 53/475 |

FOREIGN PATENT DOCUMENTS

| | | | |
|---|---|---|---|
| 2363030 | 7/1975 | Fed. Rep. of Germany | 53/535 |
| 2501028 | 11/1975 | Fed. Rep. of Germany | 53/537 |
| 2457806 | 1/1981 | France | 53/537 |

*Primary Examiner*—Robert L. Spruill
*Assistant Examiner*—Steven P. Weihrouch
*Attorney, Agent, or Firm*—Kinzer, Plyer, Dorn, McEachran & Jambor

[57] ABSTRACT

A machine and a method for density packing of cylindrical plastic objects such as caps in layers in rectangular containers. The machine includes an elongated table and a vertical transfer mechanism for the plastic objects located at one end of the table. A loading mechanism is provided at the opposite end of the table to form a row at a time of plastic objects on the table. A pusher bar is provided to move each individual row of plastic objects along the table to an assembly area where a matrix of plastic objects is formed. A second pusher bar is provided to move the assembled matrix of plastic objects to a position under the vertical transfer mechanism. A lifting mechanism is formed as part of the vertical transfer mechanism and is arranged to lift all of the plastic objects simultaneously from the table, lower them into a container, release them in unison to form a layer of objects in the container and to raise itself above the table to await the next assembled matrix of objects being loaded on the table a row at a time. The lifting mechanism is rotated 180° for adjacent layers of objects to prevent nesting of plastic objects in adjacent layers.

8 Claims, 10 Drawing Figures

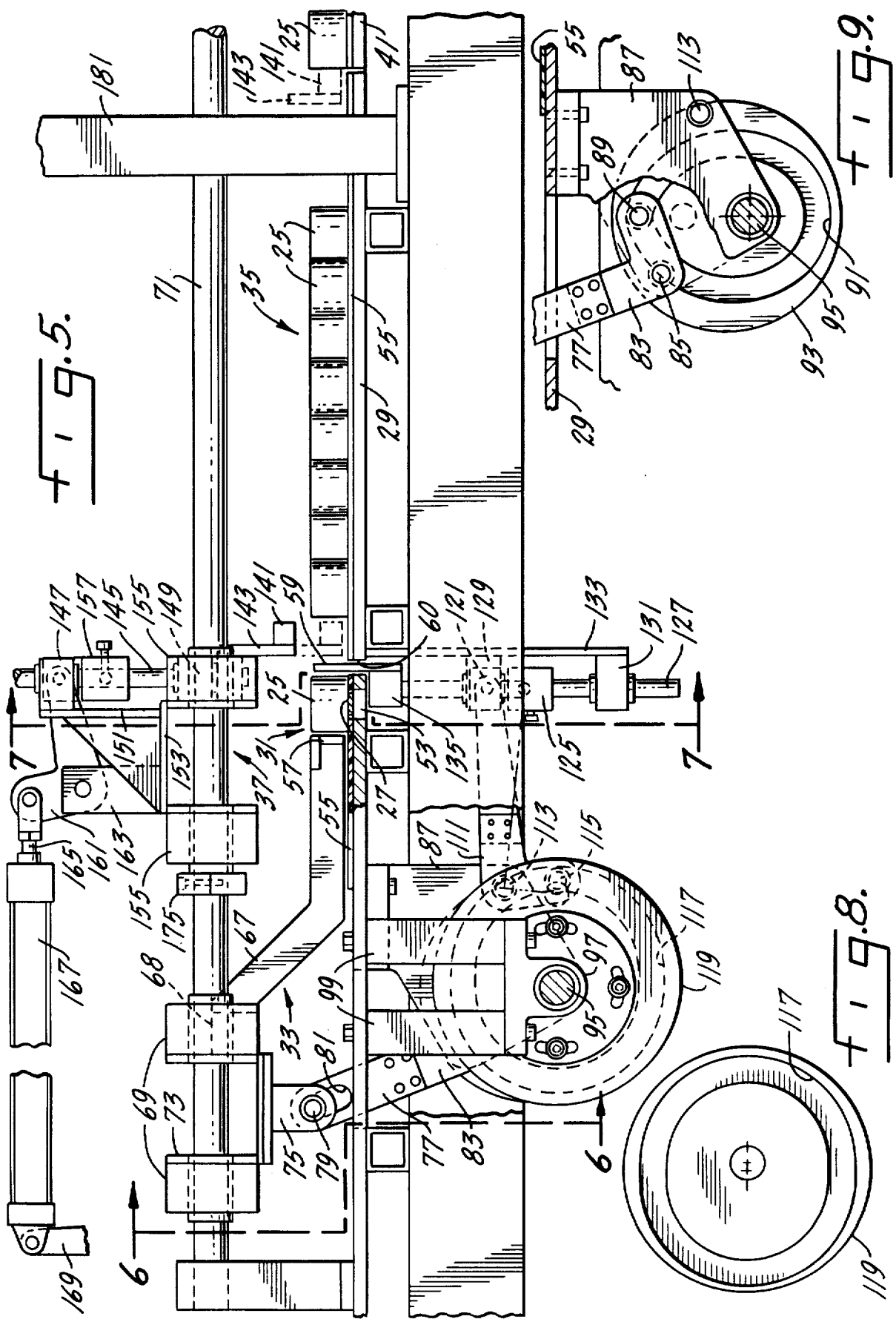

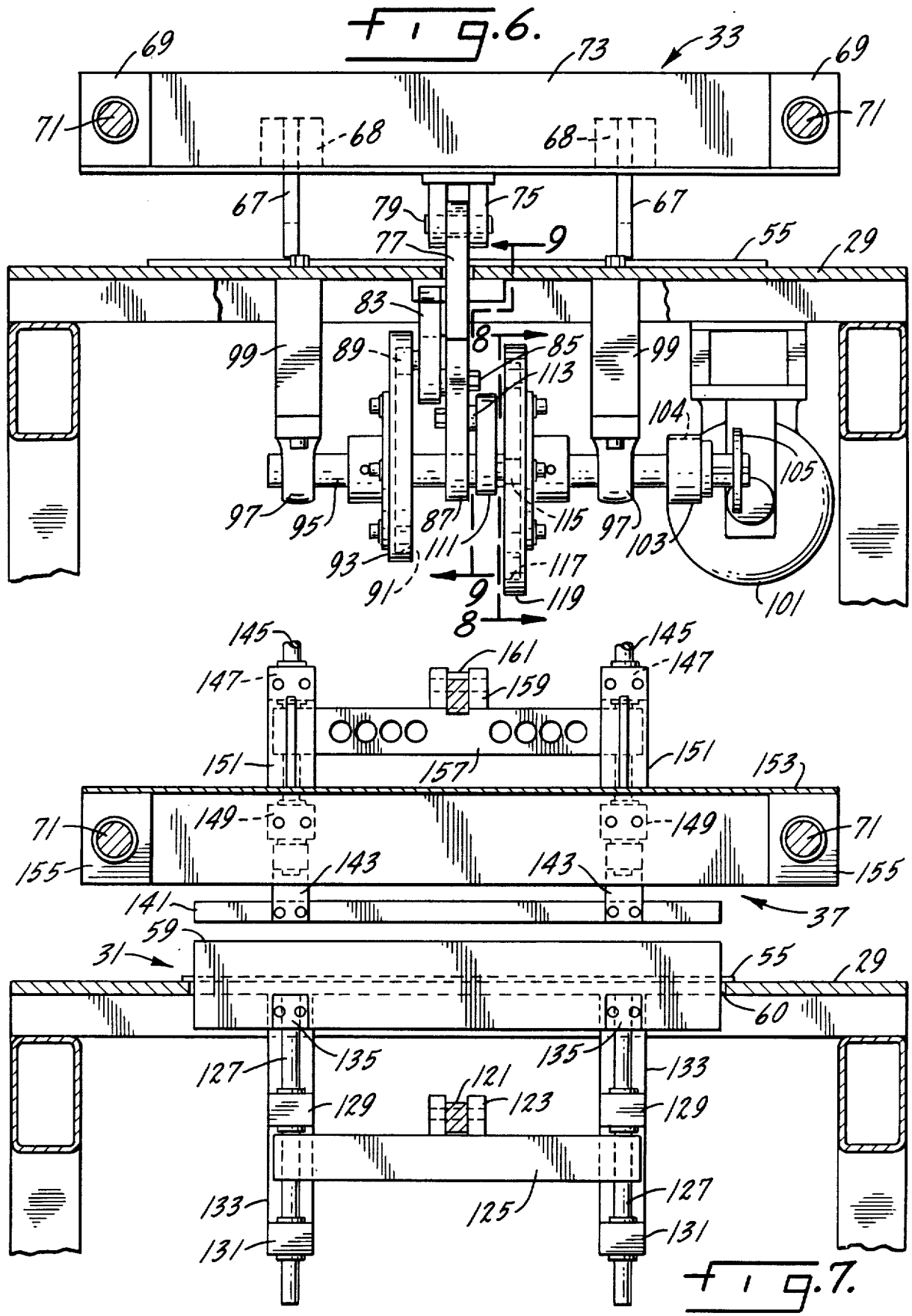

PACKAGING MACHINE AND METHOD

BACKGROUND AND SUMMARY OF THE INVENTION

It has been conventional practice to bulk load cylindrical plastic objects such as aerosol caps into corrugated containers as the caps are conveyed from a molding press. Bulk packing of containers is fast and inexpensive insofar as labor is concerned, but is uneconomical insofar as the most sufficient use of containers, storage areas and shipping facilities is concerned. If the cylindrical plastic objects were density packed, i.e. packed in layers and in alternate nested rows in each layer, approximately 20 percent more plastic objects could be placed in each container. However, to do this by hand is extremely labor intensive and, therefore, uneconomical.

This invention is concerned with a mechanism and a method for automatically packing cylindrical plastic objects such as aerosol caps in a container in a density packed arrangement.

An object of this invention is a mechanism for automatically packing cylindrical plastic objects in containers in density packed arrangements as quickly as they are produced by a molding press.

Another object of this invention is a mechanism for automatically packing the plastic objects in layers and in staggered rows in each layer in a container for maximum density.

Another object of this invention is to automatically pack the plastic cylindrical objects in layers in a container without the need for separators between the layers.

Another object of this invention is to automatically rotate each layer of cylindrical plastic objects 180° relative to a lower layer in a container to prevent vertical nesting of the plastic objects without requiring separators between the layers of plastic objects in the container.

BRIEF DESCRIPTION OF THE DRAWINGS

The invention is illustrated more or less diagrammatically in the following drawings wherein:

FIG. 2A is a partial side elevational view of the upper portion of the machine which is not shown in FIG. 2;

FIG. 5 is an enlarged partial side elevation view of a portion of the machine with some parts broken away and moved positions shown in dashed lines;

FIG. 6 is a partial cross-sectional view taken along line 6—6 of FIG. 5; and

FIG. 7 is a partial cross-sectional view taken along line 7—7 of FIG. 5.

FIG. 8 is a side elevational view of one of the machine cam wheels as viewed along line 8—8 of FIG. 6;

FIG. 9 is a partial sectional view of another cam wheel of the machine taken along line 9—9 of FIG. 6 with a moved position shown in dashed lines.

DESCRIPTION OF THE PREFERRED EMBODIMENT

Figure 1:
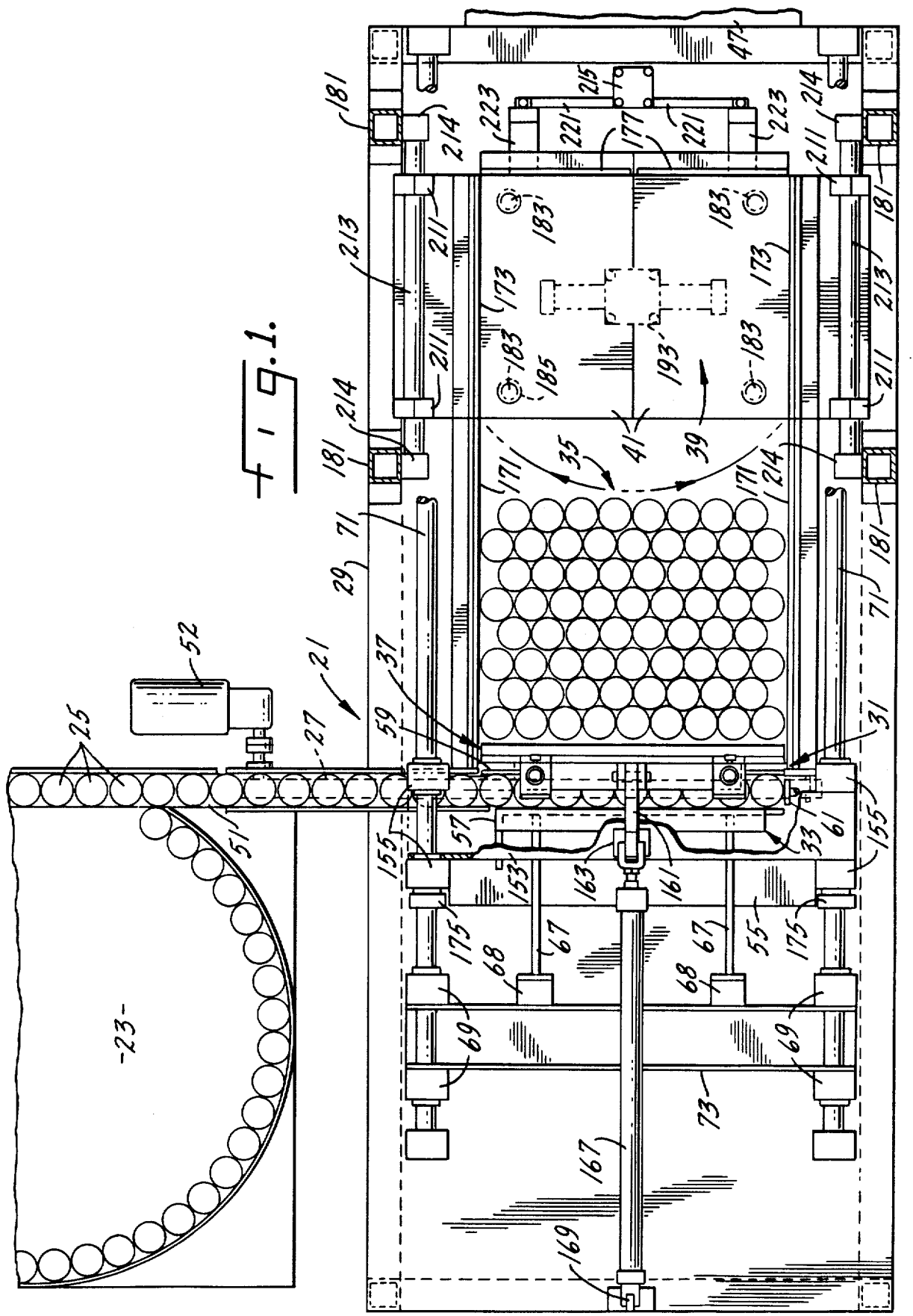
FIG. 1 is a partial top plan view of the density packing machine of this invention with some portions broken away and others shown in dashed lines for clarity of illustration.
Figure 2:
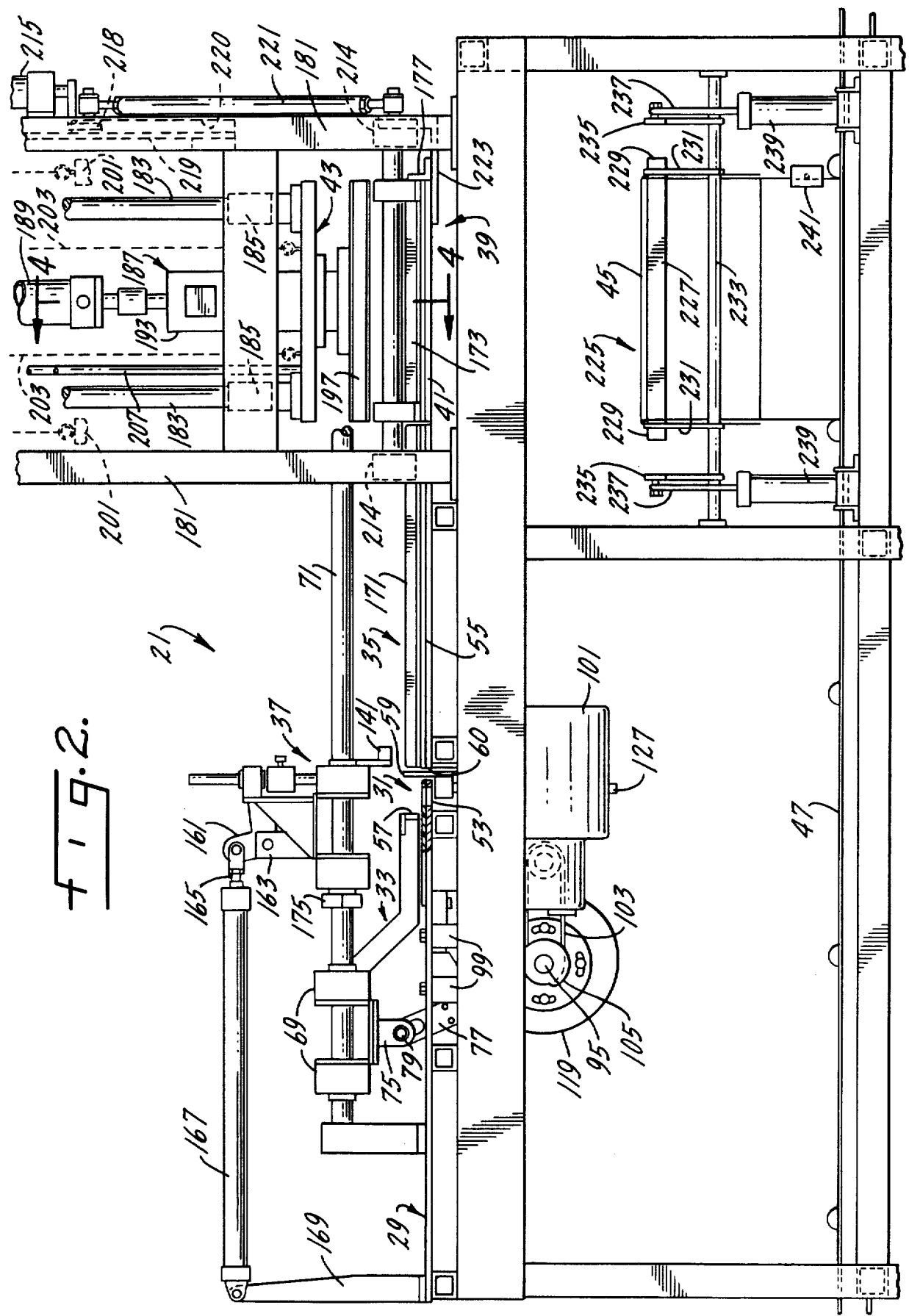
FIG. 2 is a partial side elevational view of the density packing machine of claim 1 with some parts broken away, others shown in dashed lines and the caps omitted.

Referring specifically to FIGS. 1, 2 and 2A of the drawings, a density packaging machine 21 for practicing the method of this invention includes a helical vibratory feeder 23 which feeds plastic caps 25 to a belt conveyor 27 which in turn conveys the caps onto a horizontal elongated table 29. Of course, it should be understood that any other suitable type of feeder may be used, but the vibratory feeder shown herein is the preferred type for feeding plastic aerosol caps to the belt conveyor. The belt conveyor 27 carries the caps 25 onto the table 29 between a cap row aligning means 31 and a cap row pushing mechanism 33. When a full row of caps is assembled on the table, a cap row pushing mechanism 33 pushes the row of caps to a cap matrix assembly area 35. When an entire layer of caps is formed in a matrix, a cap matrix pushing mechanism 37 pushes the matrix of caps into a discharge station 39 which is located over a pair of trap doors 41 and beneath a vertical transfer mechanism 43. The vertical transfer mechanism then lifts the matrix of caps and lowers them into a container 45 located on a cleated belt conveyor 47 which runs lengthwise under the table. It takes nine layers of caps to fill a container 45 of this embodiment, and the density packaging machine 21 is programmed so that when a container 45 is filled, another container is moved into position under the vertical transfer mechanism by the conveyor 47. A complete cycle of the machine extends from the time the first cap 25 of a container load is moved onto the conveyor 27 until the container 45 is filled with nine complete layers of caps.

Figure 4:
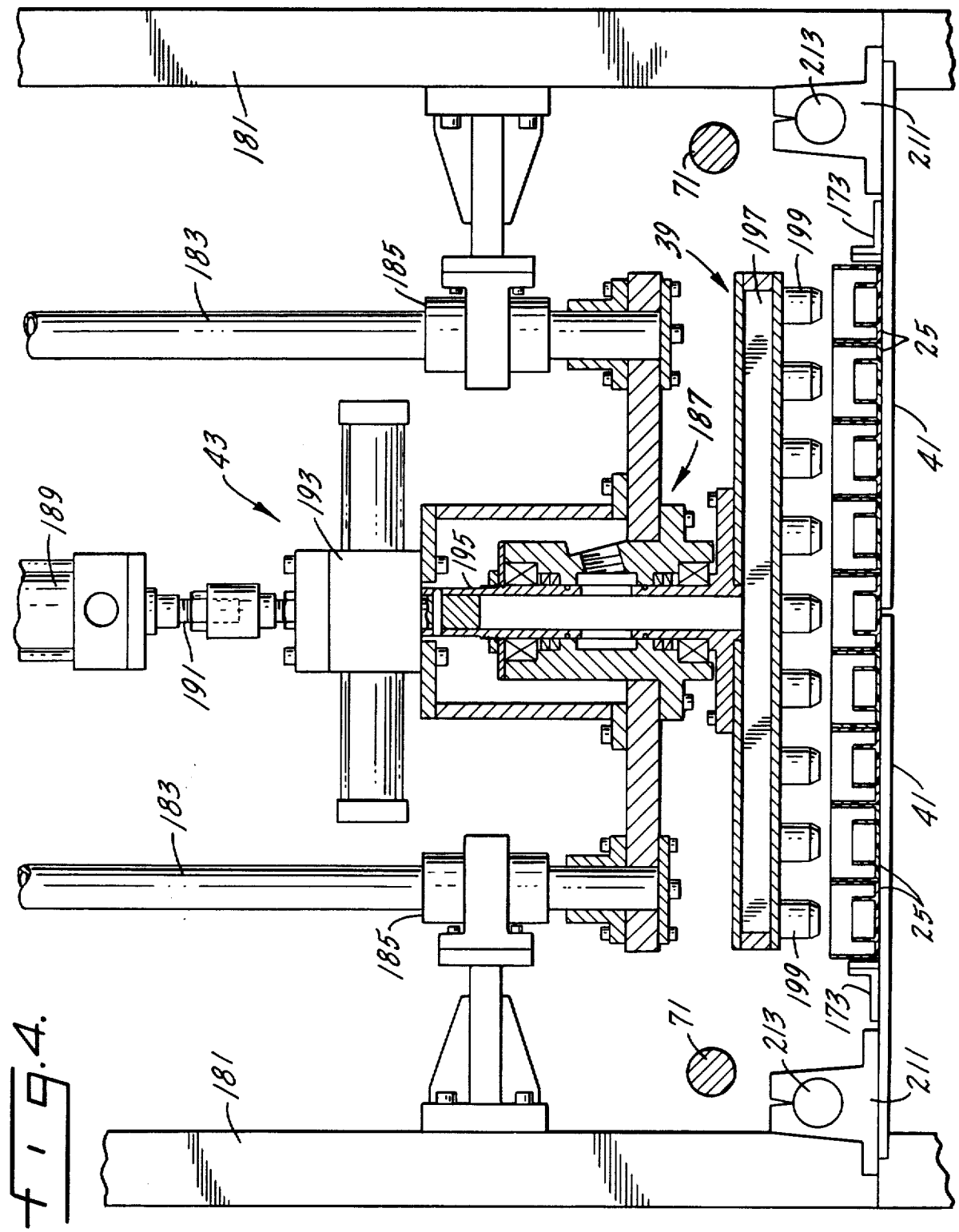
FIG. 4 is a partial end elevational view of the vertical transfer mechanism of the machine of FIG. 1 with parts broken and shown in cross-section, all shown on a somewhat enlarged scale.

The vibratory feeder 23 is a standard helical type feeder having a discharge track 51 with a width slightly greater than the diameter of a cap so as to direct the caps being discharged in a single row. The caps 25, as shown most clearly in FIG. 4, are intended to be fed onto the table 29 with the open bottoms of the caps facing upwardly. To insure that they are fed to the conveyor 27 in this manner, a drop out notch, which is not shown, is formed in the discharge track 51 of the vibratory feeder so that any cap which is not positioned with its open bottom facing upwardly is returned to the feeder. An electric eye, which is not shown, is mounted near the entrance of the belt conveyor 27 to count the caps entering the belt conveyor. The belt conveyor is driven by an electric motor 52 having a right angle drive. A slot 53 is cut in the top of the table across the width thereof to receive the belt conveyor 27. Two sheets 55 of a suitable plastic, such as polyethylene, are positioned on the table on opposite sides of the slot 53 to form a low friction surface for easy movement of the caps 27 and cap row pushing mechanism 33 along the table. The cap row aligning means 31 is formed by the pusher bar 57 of the cap row pushing mechanism 33 and a vertically moving barrier 59 which moves up and down in a slot 60 in the table 29. An adjustable cap stop 61 operated by an air cylinder, which is not shown, extends or retracts to allow either eight or nine caps to be positioned in a row across the table. In the arrangement of caps described in this embodiment, alternate rows have either eight or nine caps.

The cap row pusher mechanism 33, shown in enlarged detail in FIG. 5 of the drawings, has a pair of V-shaped arms 67 that extend longitudinally from the pusher bar 57 and then upwardly to mounting blocks 68 which are attached to slide frame 73. Slide frame 73 carries slide blocks 69 which ride on guide rods 71 extending practically the entire longitudinal length of the table. There are four slide blocks 69 with the arms 67 connected to one set of the slide blocks with this set of slide blocks connected to the other set by the channel-shaped frame 73.

The cap row pushing mechanism 33 is reciprocated on the guide rail 71 by means of a cam-driven drive mechanism located beneath the table 29. The channel-shaped frame 73 is connected to the camdriven drive mechanism by means of a clevis 75 mounted on the underside of the channel-shaped frame. A cam-driven link 77 is connected to the clevis 75 by a pivot pin 79 which is journalled in the clevis and extends through an elongated slot 81 in the link 77. An L-shaped arm 83 (FIG. 9) is fastened to the link 77 and is offset relative thereto (FIG. 6). The L-shaped arm is pivotally mounted at 85 to a bracket 87 attached to the table 29 and has a cam roller 89 which rides in a cam track 91 formed in a cam wheel 93. See FIGS. 6 and 9. The cam wheel 93 rotates with a shaft 95 supported in bearing blocks 97 attached to vertically depending supports 99. The shaft 95 is driven by an electric motor 101 through a belt 103 which engages an air actuated clutch 104 mounted on the shaft. A cam timing wheel 105 is mounted on the shaft 95 adjacent the belt.

A lifter arm 111 shown in FIGS. 5 and 6 is pivotally mounted at 113 to the bracket 87. A cam roller 115 also attached to this arm is guided in a cam track 117 of a cam wheel 119 which is fixed to rotate with the shaft 95. The distal end 121 of the lifter arm is pivotally connected to a clevis 123, as shown in FIG. 7, mounted on a cross bar 125. The cross bar is attached at its opposite ends to vertically extending rods 127. The rods are journalled in upper and lower bearing blocks 129 and 131, respectively, which also act as upper and lower stops for the cross bar 125. The bearing blocks 129 and 131 are mounted on support plates 133 which hang down from the table 29. At their upper ends, the vertically extending rods 127 are connected to blocks 135 which in turn are connected to the vertically moving barrier 59. Rotation of the cam wheel 119 will raise and lower the distal end 121 of the lifter arm 111 to raise and lower the barrier 59 through the slot 60 in the table 29.

The cap matrix assembly pushing mechanism 37 is shown in detail in FIGS. 2, 5 and 7 of the drawings. It includes a transversely extending pusher bar 141. The pusher bar is attached to blocks 143 fastened to the bottom end of vertically extending rods 145. The rods 145 are journalled in upper and lower bearing blocks 147 and 149. The upper bearing blocks 147 are mounted on uprights 151 supported on an inverted channel-shaped member 153 which itself is supported on bearing blocks 155 to slide on the rods 71. The bearing blocks 155 are directly connected to the sides of the inverted channel-shaped member 153.

A cross bar 157 is affixed at its ends to the vertical rods 145 and moves vertically with these rods. A clevis 159 is formed on the top of the cross bar, and the end of the long arm of a crank arm 161 is pivotally connected to the clevis. The crank arm is pivotally mounted to an upstanding clevis 163 supported on the inverted channel-shaped member 153. The short arm of the crank arm 161 is pivotally connected to a piston rod 165 of a pneumatic piston 167 which in turn is pivotally attached at its other end to an upstanding support 169 mounted on the table 29.

The initial movement of the piston rod 165 out of the cylinder 167 rotates the crank arm 161 and thereby lowers the pusher bar 141 to a position immediately adjacent the plastic sheets 55 on top of the table 29 where the pusher bar can engage the caps 25 of the matrix of caps. Continued movement of the piston rod 165 out of the cylinder 167 then moves the matrix of caps from the matrix assembly area 35 to the cap matrix discharge station 39. The fully extended position of the pusher bar 141 is shown in dashed lines at the extreme right hand side of FIG. 5 of the drawings. As the matrix of caps is moved on the plastic sheet 55 positioned on top of the table 29, the caps are guided between guide rails 171 located on opposite sides of the table. Guide rails 173 extend across the trap doors 41 as can best be seen in FIGS. 1 and 4. Guide rails 171 and 173 have their vertical faces covered with plastic for low friction movement of the caps. Return movement of the cap matrix pushing assembly is limited by stop blocks 175 and cushion springs (not shown) mounted on guide rails 71. A stop rail 177 is located at the end of the table.

The vertical transfer mechanism 43 is shown in detail in FIGS. 1, 2, 2A, 3 and 4 of the drawings. It includes a vertical framework 181 mounted on the table 29 over the trap doors 41. Four vertically slidable support rods 183 are guided in guide sleeves 185 supported on the framework 181 near the top and lower portions thereof. This arrangement is most clearly shown in FIGS. 2A and 4 of the drawings.

A lifting mechanism 187 (FIG. 4) for the caps 25 arranged in a matrix is attached to the bottom ends of the support rods 183. The lifting mechanism is raised and lowered by an air cylinder 189 attached to the top of the framework 181, as is shown most clearly in FIG. 2A of the drawings. Piston rod 191 of the air cylinder 189 connects to a pneumatic rotator 193 which rotates a depending shaft 195. The shaft 195 is rotatably journalled in bearings carried on the lifting mechanism 187. Attached to the bottom end of the shaft 195 is a hollow disc-shaped vacuum chamber 197 having a plurality of downwardly extending prongs 199 arranged in a matrix pattern corresponding to that of the matrix of the caps 25. The prongs 199 each function as a vacuum nozzle having an outlet (not shown) at its tip so that each prong 199 can pick up a cap 25 of the matrix of caps resting on the trap doors 41 of the cap matrix discharge station. The tip of each prong is beveled so that the prong will easily slide into the inner sleeve of its corresponding cap and align it for pick up. The vacuum chamber 197 is rotated 180° after picking up alternate layers of caps so that the caps of one layer do not telescope into the caps of a lower layer when they are lowered into the container 45 and released. The lifting mechanism 187 is supported by counterbalance weights 201, shown in FIG. 2A. The weights are supported by chains 203 which ride on sprockets 205 mounted on top of the framework 181. A vertically extending rod 207, shown in FIGS. 2 and 2A, is supported on the vacuum chamber 197, has a series of holes 208 extending therethrough equal in number, in this instance nine, to the number of layers of caps in the container 45. An electric eye 209 aligned with the rod 207 counts the number of holes 208 which pass as the rod is lowered to set the lowered position of the vacuum chamber 197 as the container is filled with layers of caps from the bottom layer to the top layer of the container.

The trap doors 41 are attached to hinges 211 rotating about horizontally extending pivot rods 213 supported on stanchions 214 attached to the framework 181. The trap doors are opened and closed by means of an air cylinder 215, shown in FIGS. 2 and 3, mounted on the side of the framework 181. A rod 217 from the air cylinder 215 is connected to a plate 218 which slides in grooves 220 of plate 219. Pivotally connected to the plate 218 are extendable rods 221, each of which connects to a bracket 223 attached to one of the trap doors 41. When the trap doors are open, as shown in dashed lines in FIG. 3, they clear the top of a carton 45 which is held in position on the cleated belt conveyor 47 so as to receive a layer of caps that are lowered by the vacuum chamber 197.

Figure 3:
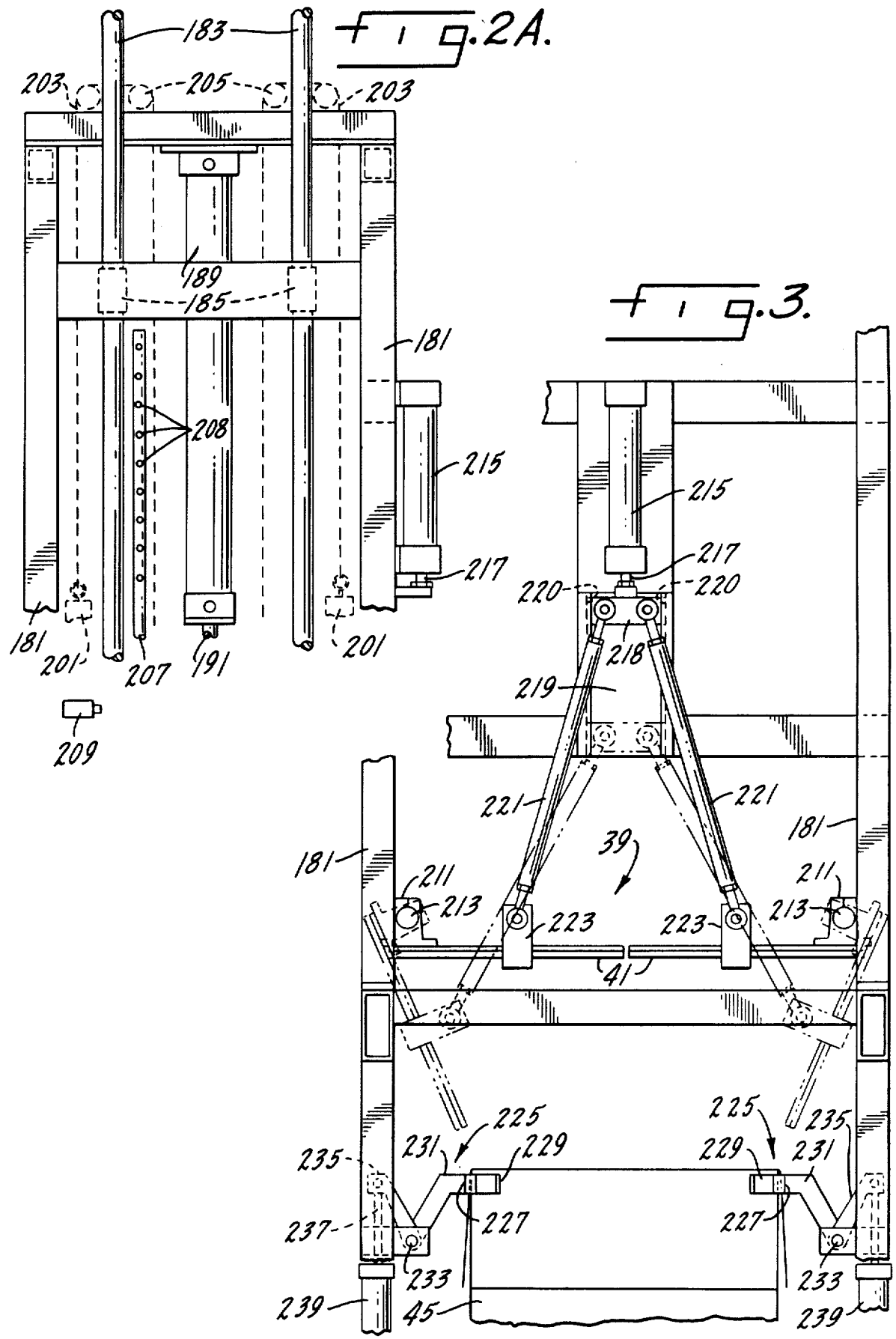
FIG. 3 is a partial end elevational view as viewed from the right of the machine of FIG. 1 with some parts omitted and a moved position shown in dash lines.

Referring to FIGS. 2 and 3 of the drawings, container positioning and holding mechanisms 225 are located below the trap doors 41. Each positioning and holding mechanism includes a clamping bar 227 located on a side of the conveyor 47. Each clamping bar has diagonally extending fingers 229 on the ends thereof which fingers fit around the ends of the container when the clamping bar engages the container. Each clamping bar is mounted on arms 231 which are attached at their lower ends to a shaft 233 rotatably mounted on the table 29. Crank arms 235 are also fastened to the shaft 233 and are connected to piston rods 237 of air cylinders 239. When the piston rods 237 are extended out of the air cylinders 239, the clamping bars 227 are moved into engagement with a container 45. When the piston rods are retracted into the air cylinders, the clamping bars are moved out of engagement with the container. An electric eye 241 is positioned to sense and position the leading end of the container 45 as it is moved along the conveyor 47.

THE USE, OPERATION AND FUNCTION OF THE INVENTION ARE AS FOLLOWS

The operation of the density packing machine 21 to perform the method of this invention is controlled by a programmable computer which directs the sequence of movements of the air cylinders and the cam wheels in response to signals received from limit switches and electric eyes positioned at strategic locations throughout the machine. The programmable computer used in the preferred embodiment of the invention is built by The Allen-Bradley Company and sold under the designation SLC100, although it should be understood and appreciated that other suitable programmable computers may be used. The computer is programmed to provide a matrix of caps 25 in the cap matrix assembly area 35 arranged in eight rows with alternate rows of eight and nine caps respectively. As shown in FIG. 1 of the drawings, the first row positioned on the table has eight caps and the next row has nine caps, with the caps of each row nested between a pair of caps of the adjacent row to provide a density spacing of caps. The ease of programming of the computer permits changes in the design of the matrix for different sizes of caps and containers of different sizes and shapes.

Although not shown in the drawings, the injection molded caps 25 are delivered directly by a conveyor from an injection molding press into the vibratory feeder 23. The vibratory feeder delivers caps with their open ends facing upwardly in a single width row to the belt conveyor 27. The belt conveyor carries the caps across the width of the elongated table 29. An electric eye (not shown) located under the conveyor counts the number of caps and stops the conveyor 27 when the proper number of caps for a particular row has been delivered to the table. An air cylinder operable stop 61 located at the far end of the conveyor 27 has a piston which is moved in or out in accordance with a signal from the computer to position the leading cap in the row at the proper location on the table. The first cap of a row of eight caps is stopped farther from the edge of the table than a row with nine caps, as can be seen by viewing the matrix of caps 25 in FIG. 1.

When a row of caps 25 is completed, the barrier 59 is lowered and the pusher bar 57 is moved to the right, as viewed in FIGS. 1, 2 and 5 of the drawings, by the rotation of the cam wheel 93 to move the row of caps into the cap matrix assembly area 35 on the surface of the table 29. This operation is repeated until a total of eight rows of caps is formed on the table in the cap matrix assembly area 35.

When the complete matrix of caps is assembled, the cap matrix pusher bar 141 is lowered into contact with the plastic sheet 55 on the table 29 and is moved to the right, as viewed in the drawings, by the operation of the air cylinder 167 to push the matrix of caps to the position under the vertical transfer mechanism 43, as shown in the far right hand side of FIG. 5 of the drawings. As the air cylinder 167 retracts, the pusher bar 141 is first raised and then retracted to its original position through operation of the crank arm 161 and a return spring which is not shown. While the pusher bar 141 is moving the matrix of caps under the vertical transfer mechanism, caps are continuing to be fed onto the table 29 and formed in rows, and these rows are continuously moved into the cap matrix assembly area 35 by the cap row pusher bar 57.

When the matrix of caps 25 is positioned under the vertical transfer mechanism 43, the caps are resting on trap doors 41, which are in their closed positions. The extension of the piston rod 191 of the air cylinder 189 moves the vacuum chamber 197 and its prongs 199 into engagement with the caps 25 resting on the trap doors. Since each prong 199 has a beveled leading edge, it will automatically realign any of the caps that are slightly out of position in the matrix. When the prongs 199 are seated in the caps, vacuum drawn through the vacuum chamber 197 will hold the caps onto the prongs. The rectangular-shaped housing 197 is then raised slightly and the trap doors 41 are swung to their lowered position, as shown in FIG. 3 of the drawings, by actuation of the air cylinder 215 which moves the piston rod 217 out of the cylinder and moves the trap doors through the connecting arms 221. The vacuum chamber 197 carries the matrix of caps 25 down into the container 45, which is positioned below the trap doors 41. The first matrix of caps is carried all the way to the bottom of the container with the lowered position of the vacuum chamber determined by an electric eye which counts the number of openings in a rod mounted on and extending vertically from the housing. In the carton 45 described in this embodiment of the invention, there are nine layers of caps so that there are nine openings in the rod. The first layer of caps is lowered until the ninth hole is aligned with the beam from the electric eye. With the vacuum chamber 197 in this lowest position, the vacuum is released and the caps are dropped into the container 45. The air cylinder 189 is then reactuated to retract the piston rod 191 and lift the vacuum chamber 197 and its prongs 199 to the position shown in FIG. 4, where it awaits another matrix of caps.

For every alternate layer of caps, after the caps 25 are picked up by the vacuum prongs 199, the vacuum chamber 197 is rotated 180° in a clockwise direction by the pneumatic rotator 193. This is done to stagger each layer of caps placed in the container 45 relative to the layer below it so that one layer of caps does not telescope into the open upwardly facing ends of the lower layer of caps. The second layer of caps is lowered through the open trap doors until the electric eye 209 aligns with the eighth opening 208 from the bottom of the vertically extending rod 207, thereby stopping the descent of the layer of caps 25 at a position immediately above the layer already in the container. The vacuum holding the caps on the prongs 199 is released, dropping this layer of caps on top of the previous layer in the container. The cycle is repeated until all nine layers of caps are lowered into the container, at which time the conveyor 47 is actuated to move the filled container 45 away and bring an empty container under the trap doors 41.

As can best be seen in FIGS. 2 and 3 of the drawings, the container 45 is moved into a loading position under the trap doors 41 by operation of the conveyor 47. When the leading end of the container 45 actuates the electric eye 241, the conveyor is stopped. Container clamping bars 227 are moved into engagement with the container 45 by actuation of the air cylinders 239 to hold the container in position during the loading sequence. When the container is fully loaded, the clamping bars are retracted from engagement with the container and the conveyor 47 is actuated to move the next empty container into position under the trap doors 41.

The foregoing description has been directed to the parts of the machine of this invention whose construction and operation require a detailed description in order that a person skilled in the art will be able to make and use the invention. There are other parts of the machine which have not been shown or described, such as the operator's on/off switch, the control panel with its switches, lights and counters, air pressure gauges, filters and valves for the air supply, flexible tubing connecting the various air cylinders, air pump, vacuum pump, etc. This does not mean that these parts and components are unimportant to the machine, but only that they are so well-known to those skilled in the art that their constructions and functions may be omitted from this description in order to clarify the invention.

We claim:

1. A machine for density packing of cylindrical plastic objects in layers in containers of rectangular, horizontal cross-section, including:
    an elongated table,
    a vertical transfer mechanism for the plastic objects located at one end of the table,
    means to load the cylindrical plastic objects onto the table at the end of the table opposite to the vertical transfer mechanism end to form a row of cylindrical plastic objects on the table extending across the width thereof with the plastic objects in the row in close contact,
    said means to load the cylindrical plastic objects onto the table including a belt conveyor extending across the width of the table, a feeder supplying cylindrical plastic objects in a row to the belt conveyor and a stop at the end of the belt conveyor away from the feeder to limit the number of cylindrical plastic objects in the row, the location of the stop relative to the belt conveyor being adjustable to vary the number and position of the cylindrical plastic objects in the row being formed so that the cylindrical plastic objects in one row are staggered relative to the cylindrical plastic objects in an adjacent row,
    means to move each individual row of cylindrical plastic objects along the table towards the vertical transfer mechanism after the row is formed to thereby assemble a predetermined number of rows of cylindrical plastic objects into a matrix of plastic objects with the plastic objects in the matrix in close contact,
    means to move the assembled matrix of cylindrical plastic objects to a position under the veretical transfer mechanism,
    a lifting mechanism formed as part of the vertical transfer mechanism, and
    means to operate the lifting mechanism to sequentially:
        lift all of the plastic objects of the matrix from the table;
        lower the matrix of plastic objects to a selected vertical position below the table and release them in unison to form a layer of plastic objects in the container; and
        raise the lifting mechanism to a position above the table to await the next assembled matrix of plastic objects being loaded on the table a row at a time.

2. The machine of claim 1, including means to incrementally raise the selected vertical position to which the matrix of plastic objects is lowered during the filling of a container from a lowest position where the bottom layer of plastic objects is placed in the container to an upmost position where the top layer of plastic objects is placed in the container and to return the matrix of plastic objects to the lowest position for filling the next container.

3. The machine of claim 1 in which a trap door is formed in the table, the assembled matrix of cylindrical plastic objects is moved onto the trap door, means are provided to open the trap door after the vertical transfer means lifts all of the plastic objects of the matrix from the trap door and to close the trap door after the vertical transfer mechanism is raised to a position above the table after releasing the matrix of plastic objects into the container.

4. The machine of claim 1 in which the lifting mechanism includes a vacuum manifold, a plurality of vacuum nozzles arranged on the vacuum manifold in the same pattern as the matrix of cylindrical plastic objects with each nozzle positioned to engage and lift a cylindrical plastic object by vacuum.

5. The machine of claim 1 including means to rotate the lifting mechanism 180° after it lifts all of the cylindrical plastic objects of the matrix from the table and before it lowers the matrix of cylindrical plastic objects to a selected vertical position below the table.

6. The machine of claim 1 including means to position a container under the vertical transfer mechanism, means to hold the container in position under the vertical transfer mechanism while it is being filled with layers of cylindrical plastic objects, and means to remove the container from under the vertical transfer mechanism after it is completely filled with layers of cylindrical plastic objects.

7. A method of density packing of cylindrical plastic objects in layers in containers of rectangular, horizontal cross-section, including the steps of:
- delivering a quantity of cylindrical plastic objects to one end of an elongated table and forming said objects in a row extending across the width of the table,
- varying the number and positions of the cylindrical plastic objects in alternate rows using an adjustable stop so that as the cylindrical plastic objects are fed onto the table a row at a time each cylindrical plastic object in a row, other than a cylindrical object at the end of a row, is located between and in contact with two cylindrical plastic objects of an adjacent row when the rows are assembled in a matrix,
- moving each row of cylindrical plastic objects after it is formed to an assembly area to form a matrix of cylindrical plastic objects having a predetermined number of rows,
- moving the assembled matrix of cylindrical plastic objects from the assembly area to a lifting area,
- lifting all of the plastic objects of the matrix from the table while maintaining the cylindrical plastic objects in the matrix,
- lowering the matrix of cylindrical plastic objects to a selected vertical position below the table and releasing them in unison to form a layer of cylindrical plastic objects in the container,
- lowering a subsequently formed matrix of plastic objects to a selected vertical position below the table which is incrementally higher than the vertical position to which the previous layer of plastic objects was lowered in the container and releasing the matrix of cylindrical plastic objects in unison to form another layer of cylindrical plastic objects in the container, and
- continuing to lower matrices of cylindrical plastic objects into the container until the container is full.

8. The method of claim 7 including the step of rotating alternate matrices of plastic objects 180° relative to the layer below them before the matrix is lowered to said selected vertical position to prevent cylindrical plastic objects of an upper layer from nesting into cylindrical plastic objects of a lower layer.

* * * * *

UNITED STATES PATENT AND TRADEMARK OFFICE
CERTIFICATE OF CORRECTION

PATENT NO. : 4,713,926

DATED : December 22, 1987

INVENTOR(S) : John Mennie et al.

It is certified that error appears in the above—identified patent and that said Letters Patent is hereby corrected as shown below:

On the title page inventors should read

[75] Inventors: John Mennie, Granville; Donald L. Troglio; Larry E. Zielinski, both of Mark, --John A. Miguel, Palatine; William F. Schafer, Crystal Lake; Harold L. Gabbert, Park Ridge, --all of Ill.

Signed and Sealed this

Seventh Day of June, 1988

Attest:

DONALD J. QUIGG

Attesting Officer

Commissioner of Patents and Trademarks